No. 687,820. Patented Dec. 3, 1901.
J. A. CRANDALL.
ORANGE PEELER.
(Application filed June 20, 1901.)
(No Model.)
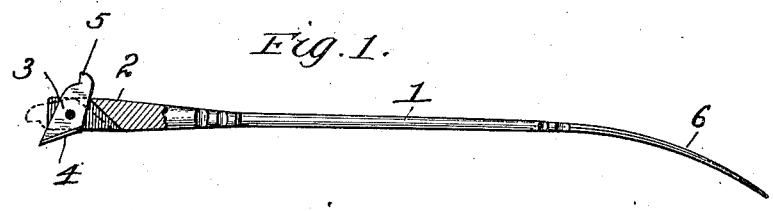
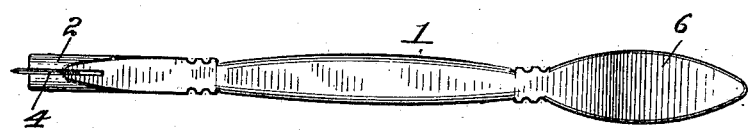
WITNESSES:
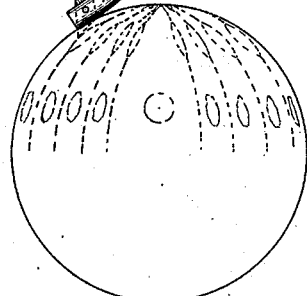
INVENTOR
Jesse A. Crandall
BY Davis & Davis,
ATTORNEYS.

UNITED STATES PATENT OFFICE.

JESSE A. CRANDALL, OF BROOKLYN, NEW YORK, ASSIGNOR TO STEPHEN V. WHITE, OF BROOKLYN, NEW YORK.

ORANGE-PEELER.

SPECIFICATION forming part of Letters Patent No. 687,820, dated December 3, 1901.

Application filed June 20, 1901. Serial No. 65,259. (No model.)

*To all whom it may concern:*

Be it known that I, JESSE A. CRANDALL, a citizen of the United States, residing in the borough of Brooklyn, county of Kings, city and State of New York, have invented certain new and useful Improvements in Orange-Peelers, of which the following is a specification, reference being had therein to the accompanying drawings, in which—

Figure 1 is a side or edge view of the device; Fig. 2, a bottom view looking at the cutting edge of the scoring-knife; Fig. 3, a view showing the operation of scoring an orange-skin, and Fig. 4 a similar view showing the operation of pushing off the skin with the peeling-blade.

The object of this invention is to provide a simple device of pleasing appearance for scoring and peeling oranges; and it consists of a handle portion having a scoring-knife at one of its ends and a peeling-blade at its other end.

Referring to the various parts by numerals, 1 designates the handle portion, which is substantially flat, its side edges being curved outward slightly to give it a pleasing appearance. One end of this handle portion is brought to cylindrical form, as at 2, and this part 2 is slotted longitudinally, said slot being perpendicular to the flat handle portion. In this slot is pivoted a scoring-knife 3, whose cutting edge 4 inclines from a point within the slot downward and forward to a point slightly beyond the free end of the cylindrical part 2. When this knife is in its cutting position, its rear edge above the pivot is in contact with the top of the end wall of the slot and limits the movement of the knife, preventing it swinging forward during the cutting operation. When desired, the scoring-knife may be turned on its pivot to house it in the slot, as shown in Fig. 4 and in dotted lines in Fig. 1. The scoring-knife is formed with a small extension 5 at its upper end, which projects beyond the end of the handle portion when the knife is folded within the slot, so that by engaging said extension the knife may be readily brought to its operating position. The scoring-knife is pointed at its forward lower end, so that it may be readily forced into the orange-skin, and the length of blade below the part 2 is approximately the thickness of the skin of an orange, so that in scoring the skin the pulp of the orange will not be injured to any extent.

To readily remove the skin from the orange after it has been scored, a peeling-blade 6 is formed integral with the other end of the handle portion. This blade is substantially elliptical in plan view, its longer axis being a continuation of the longitudinal center of the handle. This blade curves downward from its point of junction with the handle portion to its rear end, and the edge of the rear part of said blade is sharpened to enable it to be readily slipped under the skin of an orange, as shown in Fig. 4. This blade is curved, as described, to permit it to readily follow the contour of an orange. As is obvious from Fig. 4, the peeling-blade is pushed end first under the skin between the scorings and the skin is raised and forced up the convex back of the peeling-blade.

As will be seen, the device is exceedingly useful and is very pleasing in appearance. It will be readily understood that by means of this device the orange-skin may be scored in such a manner as to give it a very ornamental appearance, as shown in dotted lines in Fig. 3, and, if desired, this scored skin may be turned back by means of the peeling-blade to give the fruit a very tasteful and appetizing appearance. After the scoring is complete the scoring-knife is folded to bring its cutting edge into the slot in the handle portion, where it will be safe from injury and cannot possibly cut the hand of a person using the peeling-blade.

It will be observed that an essential feature of the scoring device lies in so mounting the blade that its outward-extending unsharpened end not only affords means for opening it, but also a stop to limit its unfolding movement and arrest it at a point where its inclined cutting edge will extend downward and forward from the handle, whereby the scoring may be done with a draw cut and also whereby the cutting edge will project beyond the under side of the blade only sufficient to cut through the skin of the orange and not into its pulp.

Having thus described my invention, what

I claim as new, and desire to secure by Letters Patent, is—

A tool of the class set forth, consisting of a handle provided with a peeling device and also a scoring device, the latter consisting of a blade pivoted in a slot formed in one end of the handle, said slot extending thereacross and having its end wall inclined forward and upward and said blade having at one end a cutting edge inclined correspondingly with said end wall and its opposite end projecting beyond the open end of the slot, whereby when the blade is open said projecting part will be arrested by the upper end of the end wall of the slot and the inclined cutting edge will extend downward and forward slightly below the under surface of the handle, as and for the purposes set forth.

In testimony whereof I hereunto affix my signature, in the presence of two witnesses, this 15th day of June, 1901.

JESSE A. CRANDALL.

Witnesses:
R. McH. RANDALL,
PERCY G. B. GILKES.